US012693969B2

(12) United States Patent
Navon et al.

(10) Patent No.: US 12,693,969 B2
(45) Date of Patent: Jul. 28, 2026

(54) DYNAMIC CLUSTERING-BASED ALLOCATION OF FREE CHUNKS AT L2P IN THIN PROVISIONING

(71) Applicant: Sandisk Technologies, Inc., Milpitas, CA (US)

(72) Inventors: Ariel Navon, Revava (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/811,536

(22) Filed: Aug. 21, 2024

(65) Prior Publication Data

US 2026/0056875 A1     Feb. 26, 2026

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC .................... G06F 12/0246; G06F 2212/7201
See application file for complete search history.

(56) References Cited

U.S. PATENT DOCUMENTS

| | | | | |
|---|---|---|---|---|
| 6,675,278 | B1 * | 1/2004 | Chowdhary | ........ G06F 12/0238 |
| | | | | 711/E12.007 |
| 9,122,614 | B1 * | 9/2015 | Kesavan | .................. G06F 3/061 |
| 9,436,399 | B2 | 9/2016 | Garson et al. | |
| 9,841,901 | B1 * | 12/2017 | Armangau | ............ G06F 3/0665 |
| 10,521,131 | B2 | 12/2019 | Yamamoto | |
| 11,340,810 | B2 | 5/2022 | Navon et al. | |
| 11,650,917 | B2 | 5/2023 | Brandt | |
| 11,650,920 | B1 | 5/2023 | Shatsky et al. | |
| 11,663,136 | B2 | 5/2023 | Xie et al. | |
| 2015/0095555 | A1 | 4/2015 | Asnaashari et al. | |
| 2019/0220416 | A1 * | 7/2019 | Jung | .................... G06F 12/1009 |
| 2023/0143926 | A1 | 5/2023 | Inbar et al. | |
| 2024/0396801 | A1 * | 11/2024 | Garcarz | .................. H04L 41/16 |

OTHER PUBLICATIONS

N-able, "Thin Provisioning Explained", Aug. 12, 2019.
Benisty et al., U.S. Appl. No. 18/582,483, filed Feb. 20, 2024.

* cited by examiner

*Primary Examiner* — Chie Yew
(74) *Attorney, Agent, or Firm* — Patterson + Sheridan, LLP

(57) ABSTRACT

Large gaps in a L2P table that are disturbed by a few occupied addresses may be efficiently utilized by locating and considering the low-density of these occupied addresses in regards to the large gap (i.e., the gap free region altogether). By identifying a gap in a L2P table and then determining if the number of occupied addresses in the gap are less than a threshold value, the gap with the limited number of occupied addresses may be indicated as available RAM buffers for the system. The limited number of occupied addresses may then be marked and replaced with other addresses to evacuate a longer sequence of free addresses that can be used by the system, thereby optimizing data storage operations. In some embodiments, conventional clustering algorithms may be used to determine gap availability. In some embodiments, the stability several gaps may be tracked and used to determine storage priority.

16 Claims, 8 Drawing Sheets

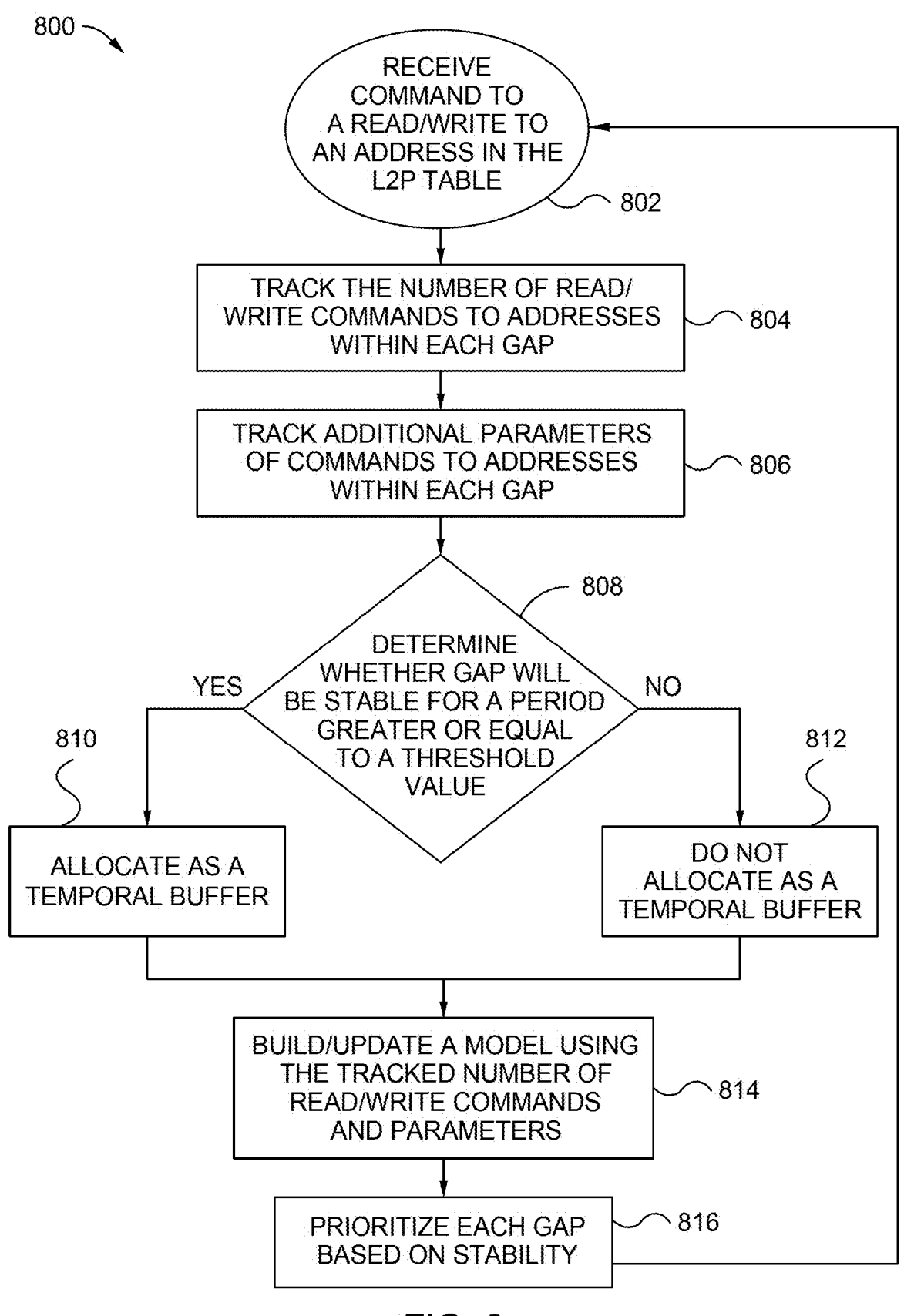

800

RECEIVE
COMMAND TO
A READ/WRITE TO
AN ADDRESS IN THE
L2P TABLE
802

TRACK THE NUMBER OF READ/
WRITE COMMANDS TO ADDRESSES
WITHIN EACH GAP
804

TRACK ADDITIONAL PARAMETERS
OF COMMANDS TO ADDRESSES
WITHIN EACH GAP
806

808

DETERMINE
WHETHER GAP WILL
BE STABLE FOR A PERIOD
GREATER OR EQUAL
TO A THRESHOLD
VALUE

YES

NO

810

812

ALLOCATE AS A
TEMPORAL BUFFER

DO NOT
ALLOCATE AS A
TEMPORAL BUFFER

BUILD/UPDATE A MODEL USING
THE TRACKED NUMBER OF
READ/WRITE COMMANDS
AND PARAMETERS
814

PRIORITIZE EACH GAP
BASED ON STABILITY
816

FIG. 8

DYNAMIC CLUSTERING-BASED ALLOCATION OF FREE CHUNKS AT L2P IN THIN PROVISIONING

BACKGROUND OF THE DISCLOSURE

Field of the Disclosure

Embodiments of the present disclosure generally relate to efficient logical to physical (L2P) table usage in thin provision or thin storage systems.

Description of the Related Art

Thick and thin provisioning represent the two rival ways to allocate storage space in centralized disk storage systems, storage area networks (SANs), and storage virtualization systems.

Thick provisioning, also known as fat provisioning, is the more conventional method. Using thick provisioning, storage space on physical media is allocated to particular users (e.g., host devices, clients, or client devices) when their drive partition is created. A set amount of storage resources are reserved for each user, regardless of how much space they are actually using. As an example, consider an office with multiple users who each need up to 50 GB of network storage where the office has a 100 GB hard drive on the network. With thick provisioning, only two users could fit on the drive. Even if one user was merely using 10 GB of space, the user would still occupy half of the capacity of the drive. Thick provisioning allocates storage space up front in anticipation of future needs, which can cause inefficiency and wasted space. If users only fill up a small portion of their quota, the rest of the space on the drive remains unused. The business must pay to maintain this excess hard drive or solid-state capacity, which takes up physical space, uses energy, and generates heat. On the other hand, the advantage of this pre-allocated space is that it guarantees there will be enough capacity available. The network will not run out of space even if both users approach their complete 50 GB quota. Moreover, thick provisioning causes no delay and no overhead in maneuvering shared physical storage space between several users.

Thin provisioning, also known as virtual provisioning or thin storage, is the rival disk provisioning method. Thin provisioning allocates disk space to users on demand based on how much space users need at any given time. As a user writes more data to the disk, the user will take up more of the physical capacity of the disk; when the user deletes data, the user's portion shrinks. Divisions on physical storage are virtual and flexible rather than determined in advance. Following the previous example, in a thin provision system, each user would only take up the amount of disk space the user is actually using. If the two users have each saved 10 GB of data into the disk (totaling 20 GB), 80 GB would remain free on the disk for other users. Therefore, the 100 GB drive can easily accommodate three or more users, each believing they have access to 50 GB of space. Essentially, the system claims to have more physical resources than are actually available. This is called "overprovisioning." Current methods of thin provisioning still suffer several drawbacks, such as greedy prioritization of the largest sequence of free addresses at a L2P table.

Therefore, there is a need in the art for improved L2P table usage in thin provisioning mode to identify gaps in the L2P tables and utilize the gaps as available RAM buffers for the system.

SUMMARY OF THE DISCLOSURE

Large gaps in a L2P table that are disturbed by a few occupied addresses may be efficiently utilized by locating and considering the low-density of these occupied addresses in regards to the large gap (i.e., the whole free region altogether). By identifying a gap in a L2P table and then determining if the number of occupied addresses in the gap are less than a threshold value, the gap with the limited number of occupied addresses may be indicated as available RAM buffers for the system. The limited number of occupied addresses may then be marked and replaced with other addresses to evacuate a longer sequence of free addresses that can be used by the system, thereby optimizing data storage operations. In some embodiments, conventional clustering algorithms may be used to determine gap availability. In some embodiments, the stability several gaps may be tracked and used to determine storage priority.

In one embodiment, a data storage device includes a memory device; and a controller coupled to the memory device, wherein the controller is configured to locate at least one gap in a L2P table, wherein a gap is a sequence of free addresses; identify an address range of a gap in the L2P table; and determine whether the address range of the gap has a number of outliers less than or equal to a threshold, wherein the threshold is greater than 0 and an outlier is an occupied address within the gap.

In another embodiment, a data storage device includes a memory device; and a controller coupled to the memory device, wherein the controller is configured to locate at least one gap in a L2P table, wherein a gap is a sequence of free addresses; scan an address region of the L2P table; identify a gap in the address region, wherein identifying the gap comprises determining whether an address in the L2P table is occupied, adding the address to an address range of the gap, and determining whether the address range of the gap has a number of occupied addresses less than or equal to a threshold; and indicate the address range of the gap as available.

In yet another embodiment, a data storage device includes memory means; and a controller coupled to the memory means, wherein the controller is configured to receive at least one read/write command for an address in an address range of at least one gap, wherein the at least one gap is a sequence of free addresses; track a number of read/write commands for addresses in the address range of the at least one gap; and determine whether the address range of the at least one gap is stable for a period greater than or equal to a threshold.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 8 is a flowchart illustrating a method of prioritizing gaps using a thin-provisioning method for L2P usage, according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered an element or limitation of the appended claims except where explicitly recited in a claim(s).

Large gaps in a L2P table that are disturbed by a few occupied addresses may be efficiently utilized by locating and considering the low-density of these occupied addresses in regards to the large gap (i.e., the whole free region altogether). By identifying a gap in a L2P table and then determining if the number of occupied addresses in the gap are less than a threshold value, the gap with the limited number of occupied addresses may be indicated as available RAM buffers for the system. The limited number of occupied addresses may then be marked and replaced with other addresses to evacuate a longer sequence of free addresses that can be used by the system, thereby optimizing data storage operations. In some embodiments, conventional clustering algorithms may be used to determine gap availability. In some embodiments, the stability several gaps may be tracked and used to determine storage priority.

Figure 1:
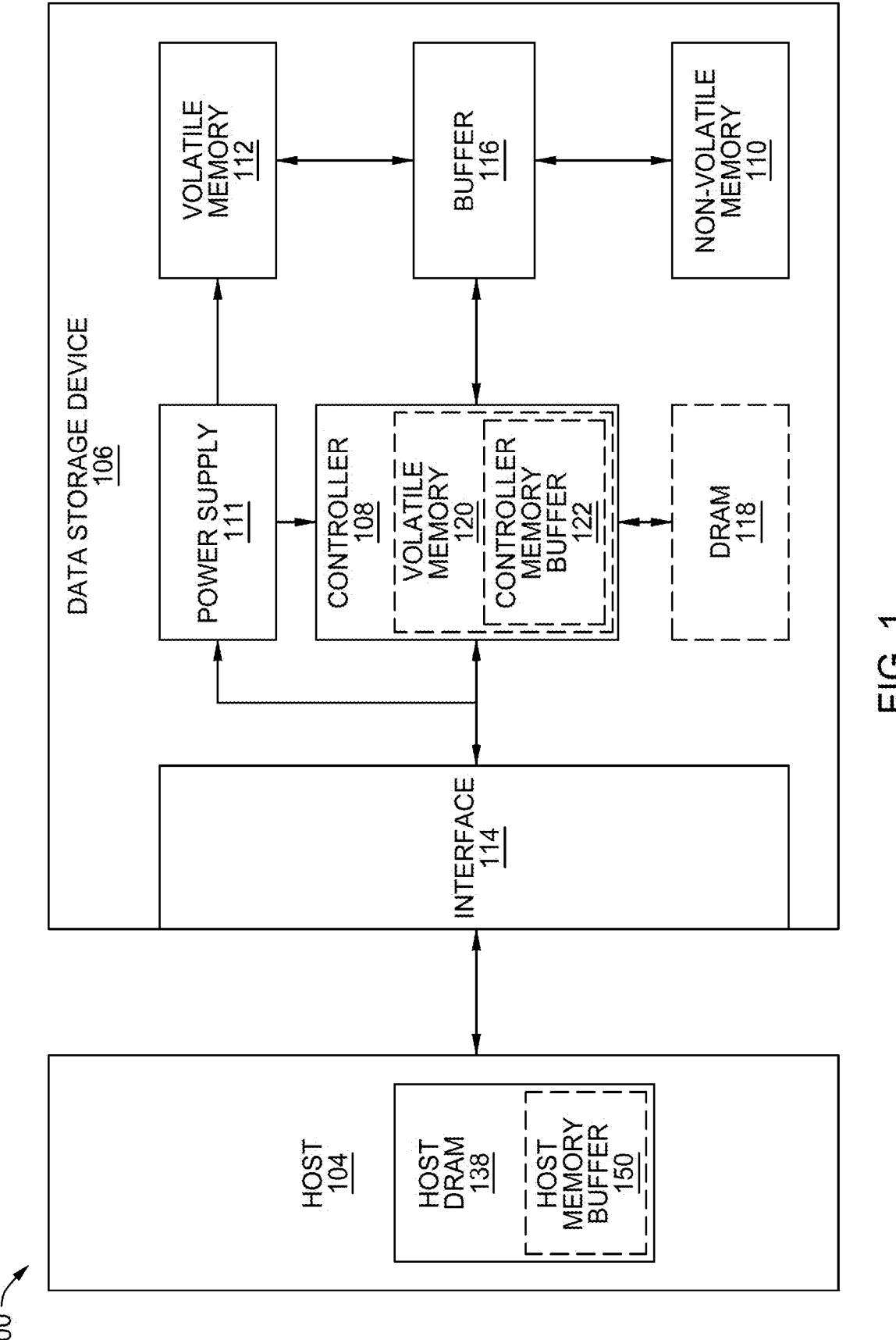
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
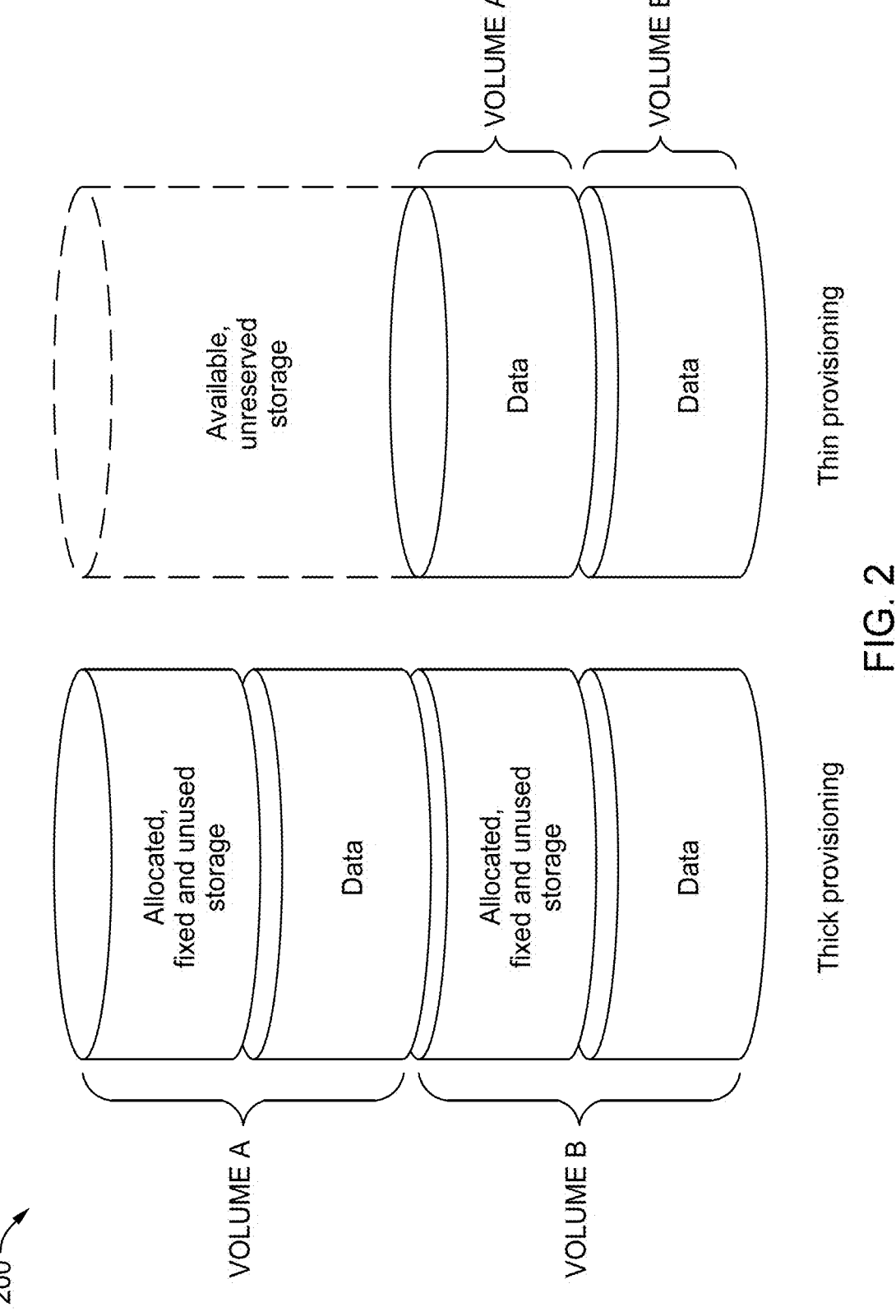
FIG. 2 is a schematic illustration of thick provisioning and thin provisioning, according to another embodiment.

FIG. 2 is a schematic illustration 200 of thick provisioning and thin provisioning and depicts the L2P management used in a thin provisioning method. In FIG. 2, it is shown that for thick provisioning, two volumes are allocated, Volume A and Volume B. However, for both Volume A and Volume B, there is some data, but also a non-negligible unused storage. The unused storage is allocated and cannot be reallocated. When the memory is allocated in thick provisioning, usually at initialization, the allocated amount of memory is fixed. If Volume A is allocated to User A and Volume B is allocated to User B, Users A and B can do whatever is desired for the allocated memory. Even if User A, for example, uses only ten percent of the allocated memory, all of the rest would be still allocated to User A and thus the unused storage would not be usable by any other user. Hence, in the thick provisioning shown in FIG. 2, there is a large waste of storage.

In thin provisioning, the allocating is not done at initialization, but rather, occurs just before usage. In the thin provisioning illustration in FIG. 2, Volume A and Volume B are only the size that meets the current needs of User A and User B. The unused storage is allocated for a free pool and whenever a User A or User B needs to write more data to the memory device, more memory can be allocated to User A or User B.

Another difference between thick and thin provisioning methods is the ability for a thin provisioning method to use disk space more efficiently than a thick provisioning method. Thin provisioning enables the squeezing of more users onto a particular volume of physical storage while avoiding additional costs relating to excessive capacity (e.g., unused disk space). Network administrators are then freed up from maintaining vast amounts of unused disk space. In turn, this reduces costs relating to the purchasing of storage, time spent maintaining the storage, and energy to run the storage. With less hardware, a thin-provisioned storage solution will take up less physical space and offer a more efficient solution over previous methods. Thus, implementing a thin provisioning method can reduce operation costs and improve the optimization of data storage devices.

Expanding upon the example for thin provisioning, if the total memory device capacity is 100 GB and there are two users, User A and User B, then at the beginning of life (i.e., initialization phase) for the memory device, 100 GB is advertised to both User A and User B. Thus, 200 GB in total is advertised even though the physical capacity is only 100 GB. However, each user (i.e., User A and User B) is told that the 100 GB capacity is allocated for them. Users A and B will then start using the memory device and the benefit of having 100 GB available. Even if User A is provisioned only 1 GB due to actual usage, the management table (i.e., L2P table) will need to be sized to handle 100 GB. Because both User A and User B are advertised 100 GB each (even though in actuality there is only 100 GB in total, not 200 GB in total), the L2P table will need to be double in size. Generally, a L2P table is implemented in SSD to hold the L2P address translation and support the nature of the flash memory technology. When the thin provisioning method is supported, the size of the L2P table is larger because the logical memory space is larger compared to the thick provisioning method.

The straightforward approach to support the thin provisioning method is to increase the size of the L2P table. In such an approach, the storage allocated for L2P tables is fully allocated to this purpose and not shared based on L2P utilization. It is contemplated that though more advanced solutions may be implemented to support thin provisioning without increasing DRAM, e.g. using hash functions, such solutions add more constraints and complexity to a system. It should also be noted that in implementing the thin provisioning mode, the allocated L2P table should support the accumulated full logical address range as seen by all users. For example, in the running example mentioned above, for an office with multiple (e.g., 2) users who each needs up to 100 GB of network storage, the L2P table should cover a storage address space of 200 GB. However, generally, each user will typically use no more than 10 GB, thus the allocated L2P table will be mostly "empty". Stated another way, the L2P table will include mostly unused "gaps" (which is a waste of an expensive resource of DRAM).

Previous methods of thin provisioning have utilized these gaps at the L2P table for system temporal buffers. Effective utilization of the allocated RAM resources could be achieved, even while working with thin provisioning L2P resources sharing mode. However, the trivial locating of such sequences of the gaps (i.e. free address ranges) at the L2P RAM (i.e., the greedy prioritization of the largest sequence of free addresses) suffers from two major drawbacks. First, large gaps that are only disturbed by a few occupied addresses may be skipped over due to a greedy trivial approach of locating gaps at the L2P table. Second, there is no indication for the expected duration that the gap will be undisturbed. Accordingly, there is a need for an effective way to locate potential sequences of ranges of free addresses (i.e., "potential gaps") at the L2P RAM, in order to optimize the utilization of the allocated L2P RAM and to minimize the disturbances caused by unstable allocations of temporal buffers and virtual L2P ranges.

Figure 3:
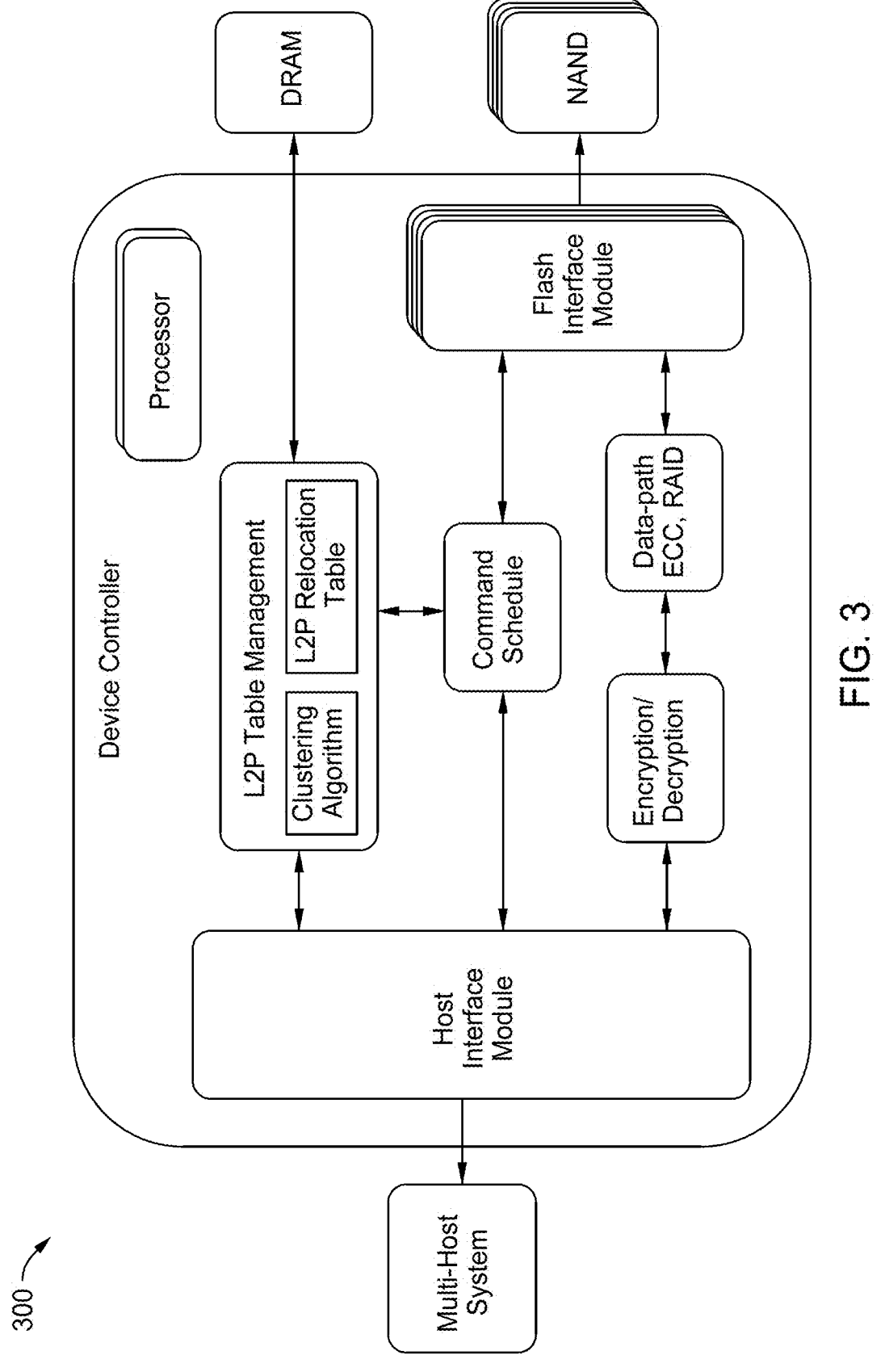
FIG. 3 is a schematic illustration of a system for L2P management, according to another embodiment.

FIG. 3 is a schematic illustration of a system 300 for L2P management, according to another embodiment. In the system 300, multiple host devices are present as is at least one volatile memory device (e.g., DRAM) and at least one nonvolatile memory device (e.g., NAND). The hosts are connected to the device controller through a host interface module (HIM) while the nonvolatile memory device is connected to the device controller through a flash interface module (FIM). The controller has one or more processors that contain circuitry to implement the program/method discussed herein. Both the FIM and HIM are coupled together through a command scheduler. Additionally, an encryption/decryption module is coupled to the HIM while a data path containing the error correction (ECC) module and redundant array of inexpensive disks (RAID) is coupled to the FIM. The encryption/decryption module is coupled to the data path. The command scheduler is also coupled to a L2P table management module that includes a clustering algorithm (discussed below in FIG. 5) module and L2P relocation table. The L2P table management module is coupled to the volatile memory and the HIM.

The L2P table management module is logic that is responsible for managing the gaps (discussed below in FIG. 4) in the L2P table and sharing those zones for other purposes such as temporal data-path buffer allocation, while utilizing a clustering algorithm and a L2P relocation table. The gaps are selected using the clustering algorithm, and the valid L2P entries in those gaps are relocated. This information is captured in the L2P relocation table. Whenever there is a request to access the L2P table, the controller first checks whether the address overlaps with a valid entry in the L2P relocation table. If there is no match, the L2P table (stored in the DRAM) is accessed regularly while using the fixed mapping between the LBA to the relevant address of the L2P entry. If there is a match, the L2P address is taken from the L2P relocation table.

Figure 4:
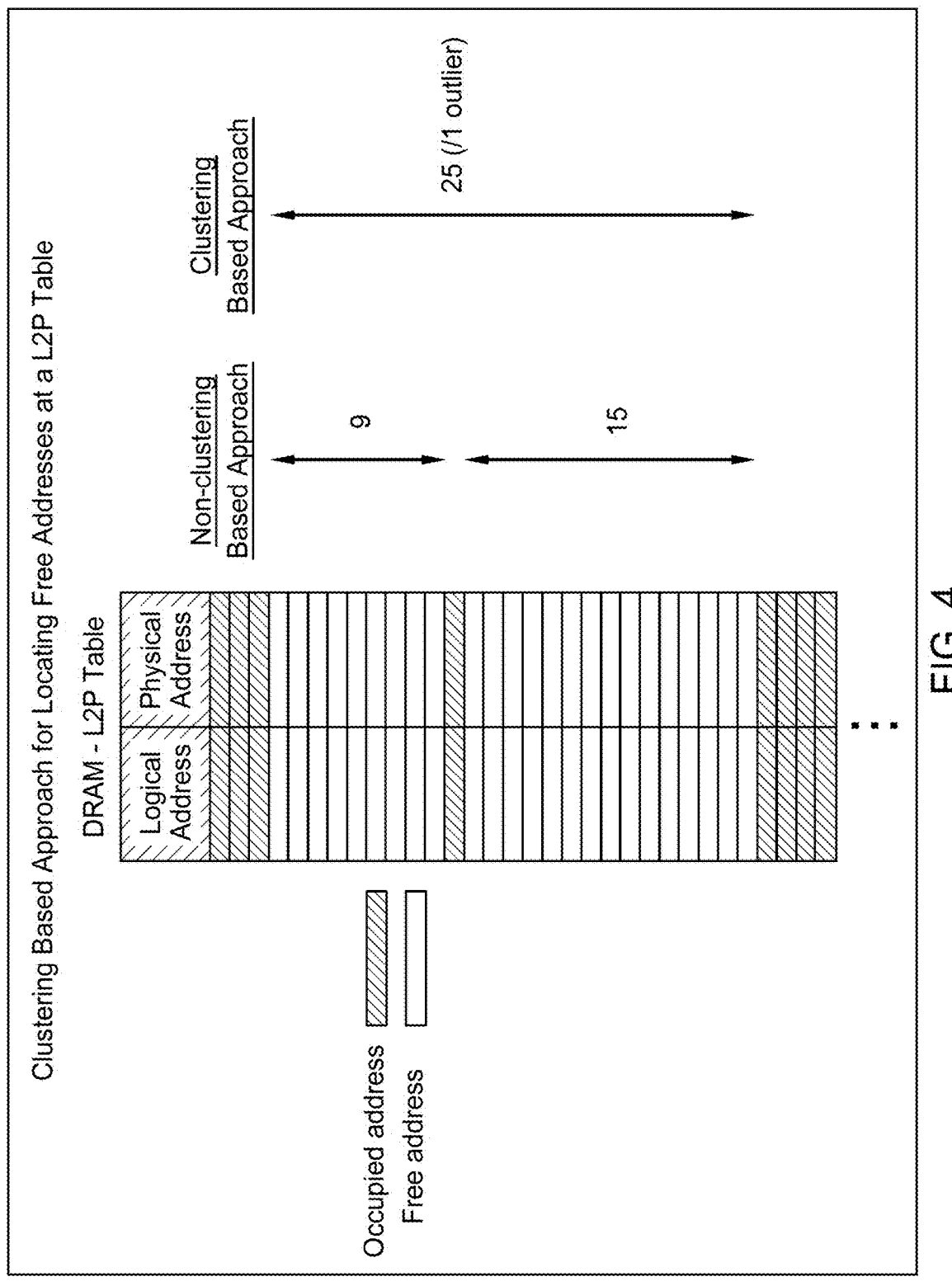
FIG. 4 is a schematic illustration of a thin-provisioning method using a clustering based approach for L2P usage, according to another embodiment.

FIG. 4 is a schematic illustration of a thin-provisioning method 400 using a clustering based approach for L2P usage, according to another embodiment. Thin-provisioning method 400 using a clustering based approach of locating free addresses for L2P usage describes a method for dynamic location and prioritization of free chunks at the L2P to optimize the utilization of the L2P temporal buffers at thin provisioning work mode. Previous greedy trivial methods (i.e., non-clustering based approaches of locating free addresses) look for the longest free address sequences that are not used by the L2P. However, by not considering a whole free region of a gap altogether and only looking for a longest free address sequence, soft-congested gaps (i.e., address regions that have a few occupied addresses located within the range of the address region) that could potentially be used as available RAM buffers by the system are skipped over due to the few occupied addresses. Thin-provisioning method 400 thus provides an advantage to system optimization by prioritizing the soft-congestion of these gaps.

Conventionally, the term "gap" at a L2P table refers to a sequence of non-occupied addresses, or free address regions, at the L2P table. However, the conventional term limits potential utilization of free address regions, which include a very small portion of occupied addresses. As discussed herein, the term "gap" is further expanded to include an address region with a low-density of occupied addresses. By further defining a gap as address regions with a low-density of occupied addresses, the large gaps at a L2P table that would otherwise be skipped in previous methods may be located and indicated as valid or available for storage. In turn, the limited number of occupied addresses in the gaps may be marked and replaced with other addresses (or otherwise saved in a temporary location) in order to evacuate a longer sequence of free addresses. It should be noted that use of the term "non-pure" free address range of a gap depends on a trade-off between the number of occupied address than lie inside this region and the length of address range.

Thin-provisioning method 400 takes into account the low-density of these occupied addresses within the address range of a gap and instead considers the whole free region of the gap altogether—thereby preventing the skipping over of the soft-congested gap which could potentially be used by the system as available RAM buffers. In cases of soft-congested address regions, previous methods (i.e., non-clustering based approaches of locating free addresses) would measure the distance between the few occupied addresses. For example, in FIG. 4 due to the occupied address, the non-clustering based approach of locating free addresses identifies two free address sequences—a 9 free address region and a 15 free address region. Whereas, the clustering based approach considers the whole free region altogether and identifies one gap (i.e., free address sequence)—a 25 address gap that has one outlier (i.e., an occupied address within the address range of the gap. In some embodiments, the occupied address may be marked and replaced with another address (or otherwise saved in a temporary location) in order to evacuate the gap.

The L2P usage for thin-provisioning method 400 is based on locating long sequences of free addresses at the L2P table, which, in some embodiments, are implemented at RAM. Not all users of the system may use the complete logical range allocated. Therefore, in some embodiments, thin-provisioning method 400 is based on allocating smaller physical address ranges, which may be shared between the users according to the actual storage capacity demands. It is noted that the L2P table of thin-provisioning method 400 should still cover the full-accumulated logical address range of all virtual users that share the same physical storage.

Since the actual use of the L2P table is limited (e.g., the physical address range is smaller than the logical address space) the gaps will be used by the system as temporal buffers for acceleration and optimization of the system performance.

Figure 5:
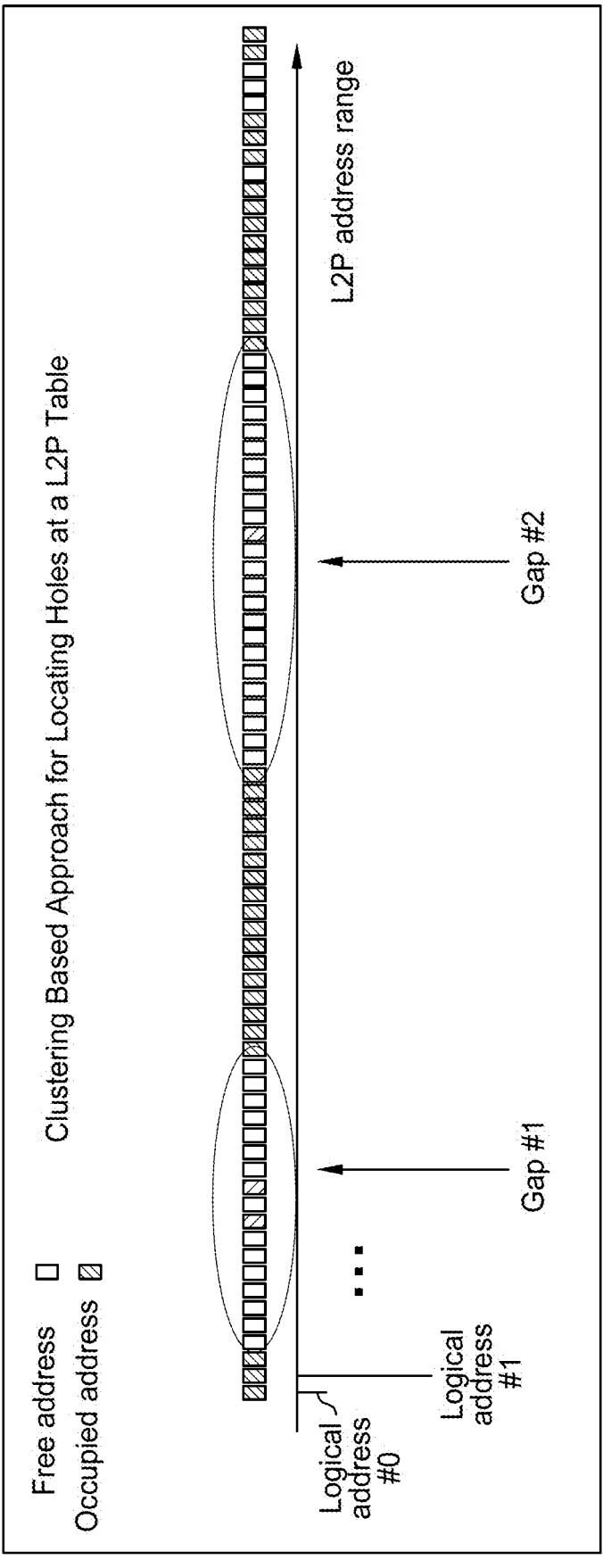
FIG. 5 is a schematic illustration of a thin-provisioning method using a simplified clustering based approach for locating gaps for L2P usage, according to another embodiment.

FIG. 5 is a schematic illustration of a thin-provisioning method 500 using a simplified clustering based approach for locating gaps for L2P usage, according to another embodiment. Thin-provisioning method 500 using a simplified cluster based approach for locating gaps at a L2P table describes a method of clustering non-pure address regions as gaps at a L2P table. In some embodiments, thin-provisioning method 500 is based on a pure-heuristic method. That is, a controller (e.g., controller 108 of FIG. 1 or the device controller of FIG. 3) scans the address regions of the L2P table, and then locates and identifies potential gaps (i.e., free address regions) before deciding if the potential gaps are gaps based on thresholds. The determination whether a potential gap are in fact gaps may be based on predefined thresholds or dynamic thresholds. In either case, a gap will be further marked as "valid" or "available" based on the threshold. For example, a potential gap is determined to be a gap if the gap has at least 1,024 free addresses with no more than five outliers (i.e., occupied addresses) in the address range of the gap. In some embodiments, a percentage of addresses of the gap that are occupied addresses is less than or equal to 0.1%. In some embodiments, for initial marking, an address range of a potential gap has 100 free addresses.

Predefined thresholds may be a number of occupied addresses (i.e., outliers) within a given address range of a gap (i.e., the given free address range size). The predefined thresholds may be fixed (e.g., no more than five outliers in the address range of the gap), or a percentage of addresses of the gap that are occupied addresses (e.g., less than or equal to 0.1%). Dynamic thresholds may be a number of occupied addresses within a given address range of a gap that is tuned during the lifetime of the device. For example, the dynamic thresholds may be tuned based on performance of the storage device, tracking the cause of the delay, or any other suitable means. In other words, if the storage device detects that system efficiency may be improved by allocating additional buffers from the L2P buffer areas and the evacuation of outliers located within the gap still pays off, then the storage device may tune the threshold (e.g., increase the threshold value) to allow evacuation of additional outliers. On the other hand, if, by tracking the performance of the storage device or a cause of delay, the storage device detects that the current threshold values are associated with significant delays and no real gain is archived by using the internal buffers, then the storage device may tune the threshold (e.g., decrease the threshold value) to allow evacuation of less outliers.

In some embodiments, thin-provisioning method 500 uses a clustering algorithm to locate potential gaps at the L2P table, such as a K-means algorithm. In some embodiments, other variants of the K-means algorithm, such as K-median (e.g., utilizing the distance metric from the median of each cluster) or K-medoids, are used to locate the gaps. In some embodiments, a K-Nearest-Neighbors (KNN) algorithm is used. In some embodiments, a Gaussian Mixture Models (GMM) algorithm is used. While it is contemplated that any suitable clustering algorithm may be used to locate the gaps, complicated algorithms (e.g., HDB-SCAN) are excessive. Whereas, a K-means algorithm is simple enough to ensure convergence properties.

The K-means algorithm is an iterative unsupervised clustering technique that partitions observations into K-clusters. Each observation belongs to the cluster with the nearest mean (e.g., a centroid or cluster center). In some embodiments, the problem is one-dimensional and the gaps are marked on the x-axis (as seen in FIG. 5). The K-means algorithm will allocate a proper identification of centroids (i.e., center addresses of each proposed gap). The number of required clusters (K) is then set by either scanning several values of K and/or considering one or more predefined parameters (e.g., the number of clusters found and/or the average/minimum/maximum/median length of the cluster and number of outliers). In some embodiments, the clustering algorithms may be tuned according to its tolerance to outliers, typical size of gaps, the expected number of gaps at the gap RAM, the ratio of number/size of gaps out of the overall RAM size, or number/size of outliers inside such a "gap."

Figure 6:
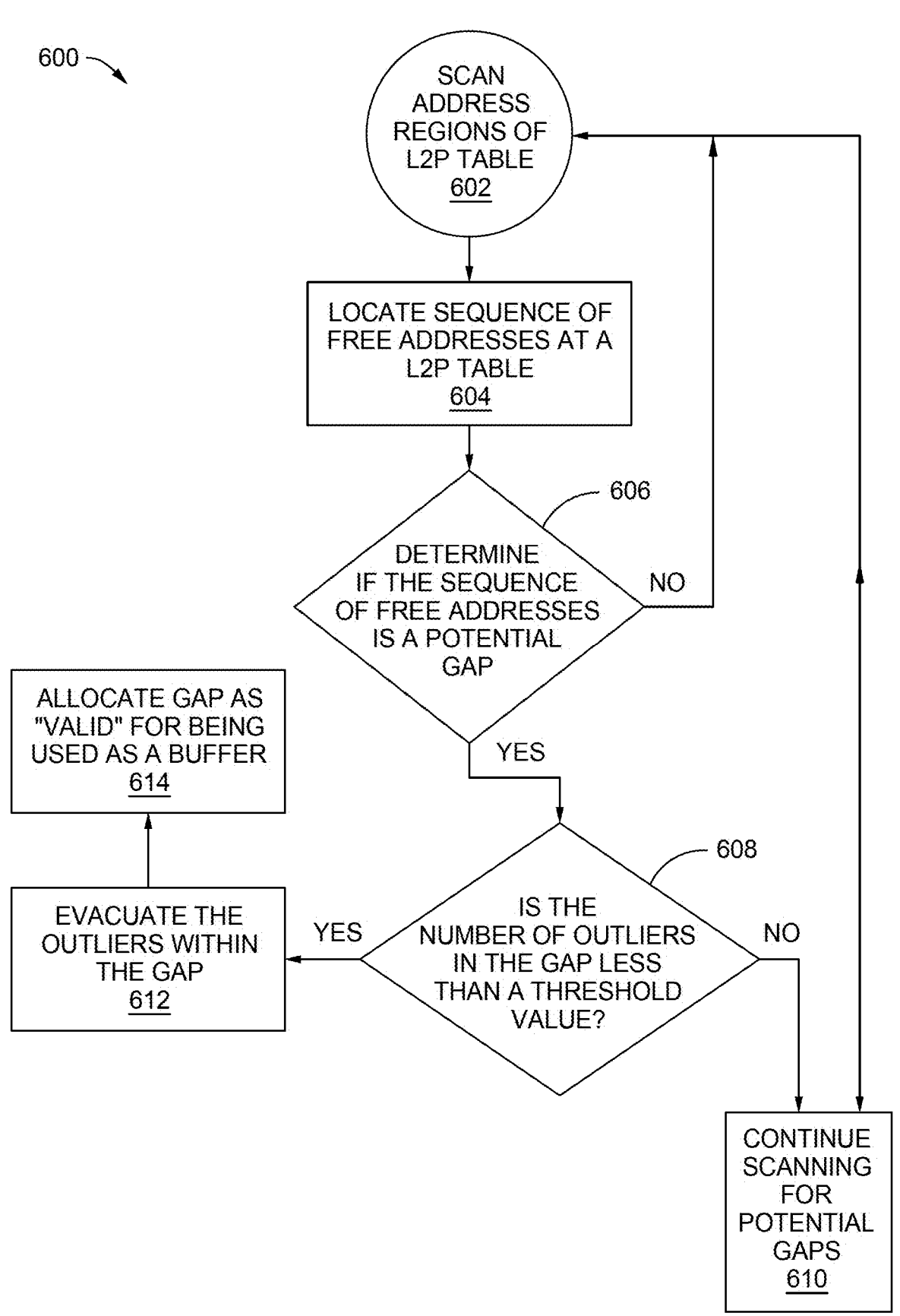
FIG. 6 is a flowchart illustrating a thin-provisioning method for L2P usage, according to another embodiment.

FIG. 6 is a flowchart illustrating a thin-provisioning method 600 for locating gaps for L2P usage, according to another embodiment. Thin-provisioning method 600 starts at operation 602, where a controller (e.g., controller 108 of FIG. 1 or device controller of FIG. 3) scans address regions of a L2P table. At operation 604, the controller locates a sequence of free addresses at a L2P table. At operation 606, the controller determines if the located sequence of free addresses is a gap based on a threshold. In some embodiments, the threshold may be a predefined threshold or a dynamic threshold.

If the sequence of free addresses is not a gap based on the threshold, then the controller returns to operation 602 and continues to scan address regions of the L2P table. If the sequence of free addresses is a gap based on the threshold, at operation 608, the controller determines whether the number of outliers within the address range of the gap is less than a threshold value. In some embodiments, the threshold value of outliers is five occupied addresses. If the number of outliers within the address range of the gap is greater than the threshold value, then at operation 610, the controller will continue scanning for further potential gaps in the L2P table and return to operation 602. In some embodiments, the controller may further indicate that the address range of the gap is not valid or unavailable for use by the system as an available RAM buffer. If the number of outliers within the address range of the gap is less than or equal to the threshold value, at operation 612, the controller will evacuate the outliers within the gap. In some embodiments, the controller may also determine the address range (e.g., the start and end address) of the gap. At operation 614, the controller will indicate that the address range of the gap is valid or available for use by the system as an available RAM buffer.

Figure 7:
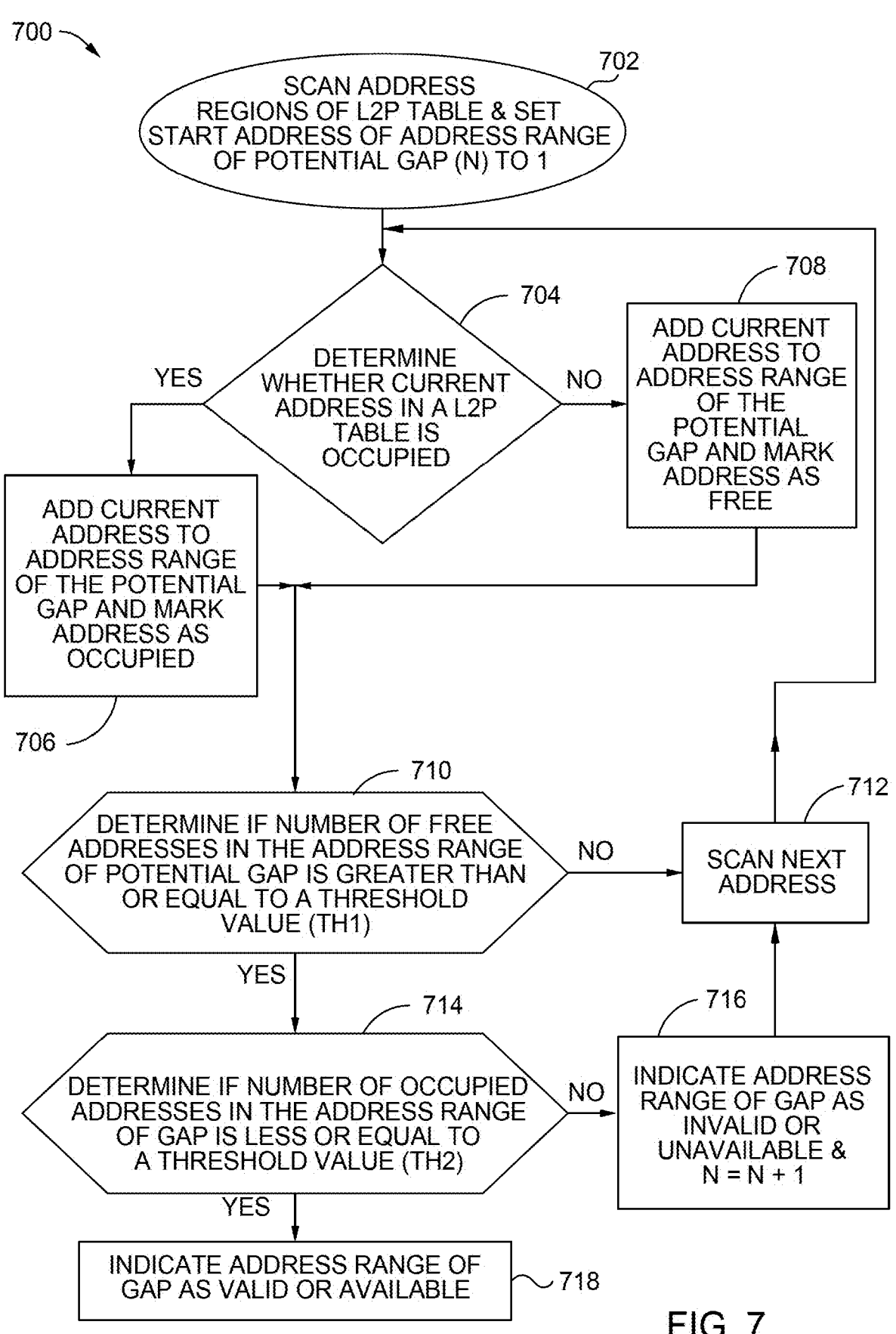
FIG. 7 is a flowchart illustrating a method of locating gaps for a thin-provisioning method for L2P usage, according to another embodiment.

FIG. 7 is a flowchart illustrating a method of locating gaps for a thin-provisioning method 700 for L2P usage, according to another embodiment. Thin-provisioning method 700 begins at operation 702; a controller (e.g., controller 108 of FIG. 1 or device controller of FIG. 3) scans address regions of the L2P table while setting the start address of the address range of the potential gap (N) to 1. The start address may be any address in the L2P table that the controller starts scanning at for potential gaps. At operation 704, as the controller scans through the address regions, the controller determines whether the current address in the sequence is occupied. At operation 706, if the current address is occupied the controller marks the current address as occupied and adds the current address to the address range of the potential gap, before proceeding to operation 710. If the current address is not occupied, at operation 708, the controller marks the current address as not occupied and adds the current address to the address range of the potential gap, before proceeding to operation 710. At operation 710, the controller determines if the number of free addresses (i.e., non-occupied addresses) of the potential gap is greater than or equal to a first threshold value (TH1). In some embodiments, TH1 is 1,024 free addresses. In some embodiments, TH1 is 1,024 free addresses. If the number of free addresses is less than TH1, then at operation 712, the controller scans the next address in the L2P table before returning to operation 704.

It is to be noted that the term "potential gap" indicates the sequence of scanned free addresses, and where a determination of whether the sequence of scanned free addresses has met TH1 has not yet been made. Put another way, a potential gap is identified as a gap when the controller determines that the number of free addresses in the address range of the potential gap (i.e., the sequence of scanned free addresses starting at N) is greater than or equal to TH1. When a gap has been located, at operation 714, the controller then determines if the number of occupied addresses in the address range of the gap is less or equal to a second threshold (TH2). In some embodiments, TH2 is five outliers (i.e., occupied addresses within the address range of the gap). In some embodiments, TH2 is a percentage of addresses of the gap that are occupied addresses, such as 0.1%. In some embodiments, TH2 has two conditions and is both a value (e.g., five outliers) and a percentage of addresses of the gap that are occupied addresses (e.g., such as 0.1%). In some embodiments, TH2 may be combined with additional parameters of historic access statistics (e.g., gap stability, as discussed below), including when the last access to this area of the L2P table was, or what portion of time was the area internally occupied. If the number of occupied addresses in the address range of the gap is greater than TH2, then at operation 716, the controller indicates that the address range of the gap is invalid or unavailable and updates the start address of the address range of the potential gap by 1 (e.g., N=N+1). If the number of occupied addresses in the address range of the gap is less than or equal to TH2, then at operation 718, the controller will indicate that the address range of the gap is valid or available for use as RAM buffers for the system.

In some embodiments, the controller may first determine if the number of occupied addresses in the current address range of the potential gap is less than or equal to TH2 before determining whether the number of free addresses in the address range of the potential gap is greater than or equal to TH1. That is, the order of operations 710 and 714 are swapped. In this scenario, if the controller determines that the number of occupied addresses in the current address range of the potential gap is greater than TH2, then the controller will update the start address of the current address range of the potential gap by 1 (e.g., N=N+1) and scan the next address before returning to operation 704. If the controller determines that the number of occupied addresses in the current address range of the potential gap is less than or equal to TH2, then the controller will determine whether the number of free addresses in the address range of the potential gap is greater than or equal to TH1. If the controller determines that although the number of occupied addresses in the current address range of the potential gap is less than or equal to TH2 but the number of free addresses in the address range of the potential gap is less than TH1, the controller will scan the next address before returning to operation 704.

FIG. 8 is a flowchart illustrating a method 800 of prioritizing gaps using a thin-provisioning method for L2P usage, according to another embodiment. The thin-provisioning method may be thin-provisioning methods 400, 500, 600, or 700, as discussed above. An additional advantage of the disclosure over previous methods of basic gap-marking approaches is the ability to track the stability of the located free addresses sequence, and prioritize the gaps that are expected to stay free for a longer future duration than other gaps.

In some embodiments, a controller (e.g., controller 108 of FIG. 1 or device controller of FIG. 3) holds a short table that tracks the number of read and write accesses to addresses of each gap. Only gaps that stay stable for more than a predefined period (e.g., as indicated by write/erase cycles) will be considered as a stable gap, and will be allocated as a temporal buffer. In some embodiments, additional parameters may be considered when determining gap stability, including an average write/erase command rate of each user, command size, size of the gap. These additional parameters may then be used to build an estimation model. In some embodiments, the estimation model is offline. The estimation model indicating potential stable gaps may be based either on regression models for the expected future stability period (e.g., polynomial regression), or classification models that predict whether a gap is expected to be stable for more than a predefined duration or not (e.g., linear SVM or logistic regression).

Method 800 of prioritizing gaps for L2P usage starts at operation 802, where the controller receives a command to read or write to an address in the L2P table. At operation 804, the controller tracks the number of read or write commands to addresses within each gap. At operation 806, the controller optionally tracks additional parameters of commands to addresses within each gap. At operation 808, the controller determines which gap will be stable for a period greater than a threshold value. In some embodiments, the threshold value is a period of time, such as 1 second. In some embodiments, the threshold value is a number of write/erase cycles, such as 10 write/erase cycles. If a gap will be stable for the period greater than or equal to the threshold value, at operation 810, the controller allocates the address range of the gap as a temporal buffer. If a gap will be stable for a period less than the threshold value, at operation 812, the controller does not allocate the address range of the gap as a temporal buffer. At operation 814, the controller optionally builds or updates an existing estimation model for the gaps based on the tracked number of read/write commands and/or additional parameters. At operation 816, the controller prioritizes the gaps based on the stability from the estimation model.

An improved method to identify gaps in a L2P table for system use as a RAM buffer is disclosed. By expanding the conventional use of the term "gap" to include an address region with a low-density of occupied addresses, the large gaps at a L2P table that would otherwise be skipped in previous methods may be located and indicated as available for storage. In turn, the limited number of occupied addresses may be marked and replaced with other addresses (or otherwise saved in a temporary location) in order to evacuate a longer sequence of free addresses. Further disclosed, is an improved method of prioritizing gaps based on the stability from an estimation model.

In one embodiment, a data storage device includes a memory device; and a controller coupled to the memory device, wherein the controller is configured to locate at least one gap in a L2P table, wherein a gap is a sequence of free addresses; identify an address range of a gap in the L2P table; and determine whether the address range of the gap has a number of outliers less than or equal to a threshold, wherein the threshold is greater than 0 and an outlier is an occupied address within the gap.

The controller is further configured to indicate the address range of the gap is available if the number of outliers is less than or equal to the threshold. The controller is further configured to evacuate outliers of a potential gap. The threshold is a number of addresses equal to 0.1% of the gap. The controller is further configured to indicate the address range of the gap is not available if the number of outliers is greater than the threshold. The controller is further configured scan an address region of the L2P table. The controller is further configured to determine whether the address range of the gap is available using cluster analysis. The cluster analysis comprises a k-means algorithm or a Gaussian Mixture Models (GMM) algorithm. The controller is further configured to indicate the address range of the gap is available based on the cluster analysis.

In another embodiment, a data storage device includes a memory device; and a controller coupled to the memory device, wherein the controller is configured to locate at least one gap in a L2P table for use as a random access memory (RAM) buffer, wherein a gap is a sequence of free addresses; scan an address region of the L2P table; identify a gap in the address region, wherein identifying the gap comprises determining whether an address in the L2P table is occupied, adding the address to an address range of the gap, and determining whether the address range of the gap has a number of occupied addresses less than or equal to a threshold; and indicate the address range of the gap as available.

Where identifying the gap further comprises determining whether the address range of the gap has a number of non-occupied addresses greater than or equal to a second threshold. The address range of the gap is indicated as available if the address range of the gap has a number of occupied addresses less than or equal to the threshold and a number of non-occupied addresses greater than or equal to the second threshold. The threshold is five occupied addresses and the second threshold is 1,024 non-occupied addresses. Where identifying the gap further comprises scanning a next address in the address region if the number of non-occupied addresses is greater than or equal to the second threshold. The controller is further configured to increase a start address of the address range of the at least one gap by one when the gap is indicated as not unavailable.

In yet another embodiment, a data storage device includes memory means; and a controller coupled to the memory means, wherein the controller is configured to receive at least one read/write command for an address in an address range of at least one gap, wherein the at least one gap is a sequence of free addresses; track a number of read/write commands for addresses in the address range of the at least one gap; and determine whether the address range of the at least one gap is stable for a period greater than or equal to a threshold.

The controller is further configured to allocate the address range of the at least one gap as a temporal buffer if the address range of the at least one gap is stable for a period greater than or equal to the threshold. The controller is further configured to track at least one parameter of the at least one read/write command for addresses in the address range of the at least one gap, and wherein the at least one parameter comprises a rate of write/erase commands for a user, a size of the received at least one read/write command, a size of the at least one gap, or a combination thereof. The controller is further configured to build and update a model using the tracked number of read/write commands for the addresses in the address range of the at least one gap and the tracked at least one parameter. The controller is further configured to prioritize a plurality of gaps for data storage based on the stability of each gap, wherein the at least one gap is one of the plurality of gaps.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
locate at least one gap in a L2P table, wherein a gap is a sequence of free addresses;
identify an address range of the gap in the L2P table;
determine whether the address range of the gap has a number of outliers less than or equal to a threshold, wherein the threshold is greater than 0 and an outlier is an occupied address within the gap;
indicate the address range of the gap is available if the number of the outliers is less than or equal to the threshold;
indicate the address range of the gap is not available if the number of the outliers is greater than the threshold;
relocate, to a L2P relocation table, the outliers in the address range of the gap identified as available; and
in response to a request to the L2P table, obtain a L2P address from the relocated outliers in the L2P relocation table.

2. The data storage device of claim 1, wherein the threshold is a number of addresses equal to 0.1% of the gap.

3. The data storage device of claim 1, wherein the controller is further configured to determine whether the address range of the gap is available using cluster analysis.

4. The data storage device of claim 3, wherein the cluster analysis comprises a k-means algorithm or a Gaussian Mixture Models (GMM) algorithm.

5. The data storage device of claim 3, wherein the controller is further configured to indicate the address range of the gap is available based on the cluster analysis.

6. A data storage device, comprising:
a memory device; and
a controller coupled to the memory device, wherein the controller is configured to:
locate at least one gap in a L2P table, wherein a gap is a sequence of free addresses;
scan an address region of the L2P table;
identify the gap in the address region for use as a random access memory (RAM) buffer, wherein identifying the gap comprises:
determining whether an address in the L2P table is occupied, adding the address to an address range of the gap, and
determining whether the address range of the gap has a number of occupied addresses less than or equal to a threshold;
in response to determining that the address range in the gap has the number of the occupied addresses less than or equal to the threshold, indicate the address range of the gap as available;

relocate, to a L2P relocation table, the occupied addresses in the address range of the gap identified as available; and
in response to a request to the L2P table, obtain a L2P address from the relocated occupied addresses in the L2P relocation table.

7. The data storage device of claim 6, wherein identifying the gap further comprises determining whether the address range of the gap has a number of non-occupied addresses greater than or equal to a second threshold.

8. The data storage device of claim 7, wherein the address range of the gap is indicated as available if i) the address range of the gap has the number of occupied addresses less than or equal to the threshold and ii) the number of non-occupied addresses greater than or equal to the second threshold.

9. The data storage device of claim 8, wherein the threshold is five occupied addresses and the second threshold is 1,024 addresses.

10. The data storage device of claim 7, wherein identifying the gap further comprises scanning a next address in the address region if the number of non-occupied addresses is less than the second threshold.

11. The data storage device of claim 6, wherein the controller is further configured to increase a start address of the address range of the at least one gap by one when the gap is indicated as not unavailable.

12. A data storage device, comprising:
means to store data; and
a controller coupled to the means to store data, wherein the controller is configured to:
receive at least one read/write command for an address in an address range of at least one gap, wherein the at least one gap is a sequence of free addresses;
track a number of read/write commands for addresses in the address range of the at least one gap;
determine whether the address range of the at least one gap is stable for a period greater than or equal to a threshold;
indicate a first address range of a first gap as available if a number of first outliers, in the first address range, is less than or equal to a first threshold;
relocate, to a L2P relocation table, the first outliers in the first address range identified as available; and
in response to a request to the L2P table, obtain a L2P address from the relocated first outliers in the L2P relocation table.

13. The data storage device of claim 12, wherein the controller is further configured to allocate the address range of the at least one gap as a temporal buffer if the address range of the at least one gap is stable for a period greater than or equal to the threshold.

14. The data storage device of claim 12, wherein the controller is further configured to track at least one parameter of the at least one read/write command for the addresses in the address range of the at least one gap, and wherein the at least one parameter comprises a rate of write/erase commands for a user, a size of the received at least one read/write command, a size of the at least one gap, or a combination thereof.

15. The data storage device of claim 14, wherein the controller is further configured to build and update a model using i) the tracked number of read/write commands for the addresses in the address range of the at least one gap and ii) the tracked at least one parameter.

16. The data storage device of claim 12, wherein the controller is further configured to prioritize a plurality of gaps for data storage based on stability of each gap, wherein the at least one gap is one of the plurality of gaps.

\* \* \* \* \*